United States Patent
Moreau et al.

(10) Patent No.: US 6,645,386 B1
(45) Date of Patent: Nov. 11, 2003

(54) WATER TREATMENT METHOD BY BALLASTED FLOC INCLUDING A RECYCLING OF GRANULAR MATERIAL

(75) Inventors: Pascal Moreau, Champigny sur Marne (FR); Patrick Binot, Bussy Saint Martin (FR); Genevieve Boissonnade, Paris (FR)

(73) Assignee: OTV SA (FR)

( * ) Notice: Subject to any disclaimer, the term of this patent is extended or adjusted under 35 U.S.C. 154(b) by 0 days.

(21) Appl. No.: 09/807,850
(22) PCT Filed: Nov. 18, 1999
(86) PCT No.: PCT/FR99/02836
§ 371 (c)(1),
(2), (4) Date: Jun. 18, 2001
(87) PCT Pub. No.: WO00/29335
PCT Pub. Date: May 25, 2000

(30) Foreign Application Priority Data

Nov. 18, 1998 (FR) .............................. 98 14686

(51) Int. Cl.⁷ ................................................ C02F 1/52
(52) U.S. Cl. ..................... 210/711; 210/713; 210/714; 210/721; 210/727; 210/772; 210/787
(58) Field of Search ................. 210/711, 713, 210/714, 721, 724, 725, 727, 728, 738, 758, 759, 760, 754, 772, 787, 788, 764

(56) References Cited

U.S. PATENT DOCUMENTS

| | | | | |
|---|---|---|---|---|
| 2,829,771 A | * | 4/1958 | Dahlstrom | 209/730 |
| 2,927,693 A | | 3/1960 | Freeman | 209/211 |
| 3,035,697 A | * | 5/1962 | Koch | 209/161 |
| 3,130,157 A | * | 4/1964 | Kelsall et al. | 210/512.1 |
| 3,347,372 A | | 10/1967 | Bouchillon | 209/211 |
| 3,998,734 A | | 12/1976 | Barringer | 55/17 |
| 4,696,737 A | | 9/1987 | Bouchillon | 209/210 |
| 4,816,165 A | * | 3/1989 | Carroll et al. | 210/708 |
| 4,832,854 A | * | 5/1989 | Keeter et al. | 210/788 |
| 4,927,543 A | * | 5/1990 | Bablon et al. | 210/711 |
| 5,591,348 A | * | 1/1997 | Felder et al. | 210/704 |
| 6,210,588 B1 | * | 4/2001 | Vion | 210/711 |
| 6,277,285 B1 | * | 8/2001 | Vion | 210/709 |

FOREIGN PATENT DOCUMENTS

FR 2 166378 8/1973

OTHER PUBLICATIONS

"Clarification with Microsand Seeding. A State of the Art"; Sibony, J.; vol. 15, No. 11, 1981, pp. 1281–1290; XP002109715.

* cited by examiner

Primary Examiner—Peter A. Hruskoci
(74) Attorney, Agent, or Firm—Coats & Bennett, P.L.L.C.

(57) ABSTRACT

The invention concerns a flocculation-decantation method by ballasted flocs using a granular material and a step which consists in treating the sludge derived from flocculation-decantation in a circular grit trap wherein the auxiliary liquids tangentially injected into the sludge substantially in the same direction as the latter. The invention also concerns a circular grit trap with a cylindrical part of diameter D tangentially supplied with the suspension to be treated and a conical part and provided with a cylindrical chamber injecting wash-water provided at the conical part outlet and having a diameter D' ranging between 0.35 D and 0.65 D, said cylindrical chamber having at least a tangential supply of auxiliary liquid along the same feeding direction as said tangential supply of the suspension to be treated.

9 Claims, 2 Drawing Sheets

Figure 1:
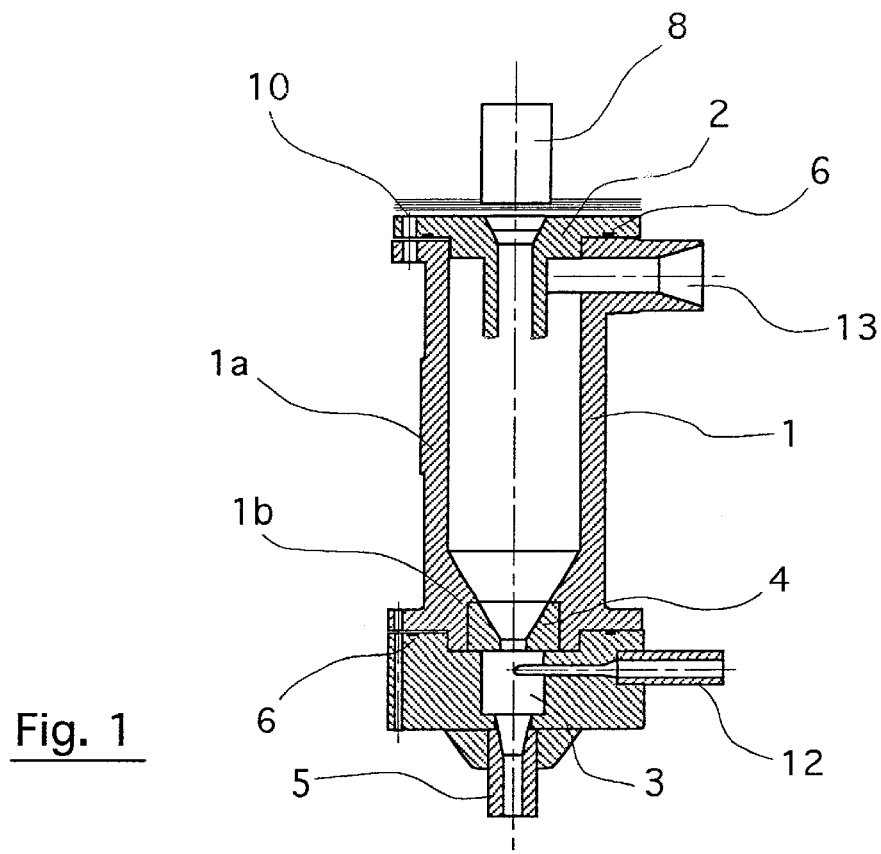

WATER TREATMENT METHOD BY BALLASTED FLOC INCLUDING A RECYCLING OF GRANULAR MATERIAL

The invention relates to the area of water treatment.

More precisely, the invention relates to a method to treat water (for its purification or potabilisation) comprising a flocculation-decantation step using floc ballasted by a granular material, according to which the ballast (granular material) that is used is at least partially recycled.

The invention also concerns the field of circular grit traps used for such recycling.

The so-called ballasted, physico-chemical flocculation-decantation technique consists of adding solid settling agents, or ballast, to the water to be treated, these being chiefly fine sand, a polymer or possibly other coagulation-flocculation agents, then of allowing floc formation around the sand. The floc, which without sand has a density very close to that of water, then settles quicker and makes it possible to use a smaller decantation surface. The sand is then recovered using mechanical separating means. The separated sludge is then directed towards a specific treatment, while the microsand and that part of the sludge which has not been separated by the sand recovery treatment, are re-added to the head of the process. Such technique is described in particular in French patent FR 1411792.

The mechanical separating means used to separate the sand from the sludge are most often made up of static centrifugal graders of cylindrical-conical shape called circular grit traps.

During said mechanical separating step, it is most frequently sought, by means of a circular grit trap, to recover sand having a particle size greater than a given particle size and to separate this sand from surrounding fine particles, so-called "fines".

In respect of water treatment, it is sought to recover the sand having a particle size greater than a given size at the downflow outlet, and the sludge at the upflow outlet. It may also be desired to wash the recycled sand of its surrounding sludge, for example to minimize the probability of recycling undesirable micro organisms at the head of a floc decanter ballasted with sand, or further to avoid, in the same type of equipment, an excessive increase in fines in the decanter, for example during water treatment of a river in spate.

The sludge may be so-called light sludge, having a density close to that of water, and then distributes itself between the upflow and downflow outlets of a usual circular grit trap in the same proportions as water.

It may also be so-called heavy sludge, clay for example and mineral particles, whose density is close to that of sand, and it therefore tends to be directed towards the downflow outlet—and therefore to be recirculated with the sand without serving any helpful purpose and possibly even being harmful to the proper functioning of the methods applied.

It is to be noted that circular grit traps do not provide a clean-cut separation in respect of the given particle size. For each particle size the probability of capturing this size is only average. The efficacy of a grit trap depends upon the density and diameter of the elements it contains (sand, sludge, clay), their concentration, the viscosity of the suspension, the characteristics of the grit trap, etc.

The most frequently used circular grit traps are formed of a cylindrical-conical chamber with a shallow cone-shape with an upflow outlet pipe in the axis of their cylindrical part and a downflow outlet pipe at the tip of the cone.

The suspension to be treated is tangentially injected under pressure into the upper cyclindrical part. A tubular opening in the axis of the cylindrical part is used to evacuate the upflows. Along this same axis, an opening at the base called apex evacuates the material reaching the downflow outlet.

The supply of suspension to be treated is conducted tangentially under pressure so as to achieve a centrifugal force which may reach more than 1000 g. It causes the formation of a vortex made up of two flows: an outer descending flow which carries with it the largest and densest particles (coarse grains, water and a small quantity of fines) towards the downflow outlet, and a central rising flow which evacuates the major part of the "fines".

With this type of circular grit trap, the upflow is practically rid of the grains larger than a given size X, the so-called cut-off value, but a certain proportion of fines (smaller than X) is carried into the downflow. The downflow is therefore never completely free of fines.

In order to improve the performance of circular grit traps, several developments have been put forward:

One development consisted of increasing the cone angle of the body of the grit trap to 90° or more. With this arrangement it is possible to increase grading, that is to say to enable two particles of close density and of different but close size to be better separated from one another.

Another development consisted of making an injection of water tangentially into the lower part of the body of a circular grit trap of shallow cone shape (less than 30°). With this technique, it is possible to improve the elimination of the fines carried with the down flow. The principle of said improvement consists of replacing the quantity of water+ sludge suspension which should normally evacuate through the downflow outlet, by fresh water. The quantities replaced in this way are eliminated via the upflow outlet. To achieve this, several successive injections of water are made above the apex, just at the point where the descending flow is contiguous with the rising flow. They are made tangentially in,the direction of the outer vortex and enable the progressive replacement of the suspension so as not to impair the descending flow, which would lead to loss of sand via the upflow outlet. The sludge, replaced gradually, is repelled towards the inner rising flow and eliminated via the upflow outlet.

In water treatment methods by flocculation-decantation using ballasted floc, it is sought to have the lowest possible loss of sand. For this purpose, the circular grit traps used are chosen for the cut-off value they can offer, for a sand particle size that is smaller than that of the microsand used as ballast. The ballast microsand is therefore practically recycled without any loss at the downflow outlet, while the lightest fines distribute themselves more or less proportionally to the flow of water between the upflow and downflow, and the heaviest fines distribute themselves statistically according to their size relative to cut-off diameter of the circular grit trap.

For some applications, the recycling of fines at the down flow is not desired, either to avoid unwanted concentration of dense fines in the decanter, which could lead to fouling or sand loss, for example for the ballasted floc decantation treatment of a river in spate containing silt; or to minimize the risk of recycling any undesirable microorganisms such as Cryptosporidlumn or Giardia with the ballast sand.

Up until now, the methods of decantation-flocculation using ballasted floc (with microsand or any other type of recycled granular ballast) use "conventional" circular grit traps whose cone angle is in the order of less than 30°, to separate the excess sludge at the upflow outlet and the granular ballast to be recycled.

In this type of circular grit trap, the fine particles forming the sludge are divided between the downflow and the upflow in a ratio approximately equal to the ratio of the water flows exiting through the same openings, that is to say usually in a ratio of approximately 10/90 to 30/70. The particles having a density close to the density of the sand tend to be recirculated in the down flow.

The purpose of the present invention is to provide better washing of the granular material that is recycled during water treatment operations using ballasted floc decantation. This objective may be sought in particular:

to treat water with a high fine content, such as water from rivers for example, to minimize possible recycling of pathogenic organisms.

Another purpose of the invention is to enable the application of a specific treatment to the sand and the residue of the recycled sludge, taking advantage of the good contacting capabilities provided by this injection mode.

A further purpose of the invention is to put forward an innovative design for a circular grit trap with injection of water into the down flow which optimises the possibilities of sand washing.

These different objectives are achieved through the invention which concerns a water treatment method including at least one flocculation-decantation step with ballasted floc, using at least one granular material, and at least one treatment step with a circular grit trap to treat at least one part of the sludge derived from said flocculation-decantation step, for the purpose of recycling at least one part of said granular material contained in the sludge, characterized in that said recycling step is implemented in at least one circular grit trap in which an auxiliary liquid is injected tangentially into said sludge essentially in the same direction as the latter.

The invention therefore proposes using, for a flocculation-decantation method, a particular type of circular grit trap, namely a circular grit trap using a tangential injection of auxiliary liquid.

According to one preferred variant, this auxiliary liquid is injected into a cylindrical injection chamber provided downstream from and at the exit of the conical chamber of a circular grit trap. Said method may be implemented by means of a new design of circular grit trap which is described below.

Preferably, said auxiliary liquid is injected in said cylindrical injection chamber at an injection rate of between 50% and 200% of a value equal to the global flow rate of the downflow of the said circular grit trap less the flow of granular material to be recycled.

In best preferred manner, said auxiliary liquid is injected into said cylindrical injection chamber at an injection rate corresponding to the global flow rate of the downflow of the said circular grit trap less the flow rate of the granular material to be recycled.

The method of the invention may be applied using any type of granular material. However, this granular material is preferably a micro-sand having a diameter of between 40 and 400 $\mu$m; preferably between 60 and 200 $\mu$m.

According to one preferred variant, said auxiliary liquid is made up of water to which is optionally added, in continuous or periodic manner, at least one washing, disinfecting or ballasted flocculation promoter reagent. Said reagent may therefore advantageously be chosen from among the group made up of sodium hydroxide, hydrochloric, sulphuric, nitric, phosphoric, citric, formic, carbonic acids, bleach, dissolved chlorine, chlorine dioxide, gaseous or dissolved ozone, hydrogen peroxide, aluminium or iron salts, flocculation polymers.

The present invention also concerns a circular grit trap specially designed to be used for the above-described method, but which may also be used for any other application requiring the separation of a particle material from a suspension of the latter. This new circular grit trap may therefore be used at the tail end of a sand removal unit positioned either at the head of the plant or on the treatment network. In this configuration, the circular grit trap will bring an improvement in the separation of sand, derived from sand removing operations, from its polluting organic fines.

The circular grit trap of the invention has a cylindrical part of diameter D provided with at least one tangential supply of the suspension to be treated, and a conical part ending in an apex, and is characterized in that it is provided with a cylindrical chamber for the injection of an auxiliary liquid at the exit of said conical part and having a diameter D' of between 0.35 D and 0.65 D, said cylindrical chamber having at least one tangential supply of auxiliary liquid along the same feed direction as said tangential supply of the suspension to be treated.

Preferably, the diameter D' of said cylindrical chamber is between 0.4 D and 0.55 D.

In best preferred manner, the diameter d of said cylindrical chamber is 0.48 D.

Preferably, said conical part has an angle $\alpha$ of between 30 and 150°, advantageously between 55 and 80°.

In best preferred manner, angle a lies between 60 and 75°.

One innovative aspect of the invention, is therefore to use the injection of an auxiliary liquid into a cylindrical chamber connected to the end of the apex of a circular grit trap having a wide angle (greater than 30°) using a combination of characteristics that has never yet been described to the knowledge of the Applicant.

Such combination of characteristics enables careful evacuation of all the sludge via the upflow outlet of the circular grit trap, irrespective of its size, shape and density, while recovering practically all the granular material, that is as clean as possible, at the downflow outlet.

With the wide angle of the downflow outlet, it is possible to recover granular material of the desired particle size with a recovery rate of over 99%. By means of the narrow cut-off value obtained, the heavier sludge such as clay is eliminated better.

The other sludge is eliminated by the injection of auxiliary liquid into the injection chamber. Said mode of injecting auxiliary liquid has not ever been proposed up until now to the knowledge of the Applicant.

Using an injection rate such as defined above, the water containing fines surrounding the granular material arriving in the injection chamber is replaced by an equivalent flow of injected auxiliary liquid.

The unique combination of these three techniques: wide angle downflow outlet, injection of water, and use of a separate cylindrical injection chamber, makes it possible to recover between 90 to over 97% of sludge at the upflow outlet. By comparison, a conventional cleaning grit trap only eliminates 80 to 90% of sludge.

In addition, by separating the grit trap from the water injection chamber, it is possible to properly conduct the grading function in the grit trap with a wide cone angle, and the fines elimination function in the injection chamber in which the water arrives tangentially. A clean granular material is therefore obtained, that is more or less concentrated, which in no way hinders the envisaged applications.

Finally, it will be noted that the proposed circular grit trap facilitates sludge rise and minimizes the risk of fouling downflow outlets through excess heavy sludge in the granular materials.

According to another preferred aspect, the circular grit trap comprises quick connection means to a source of auxiliary liquid.

Figure 2:
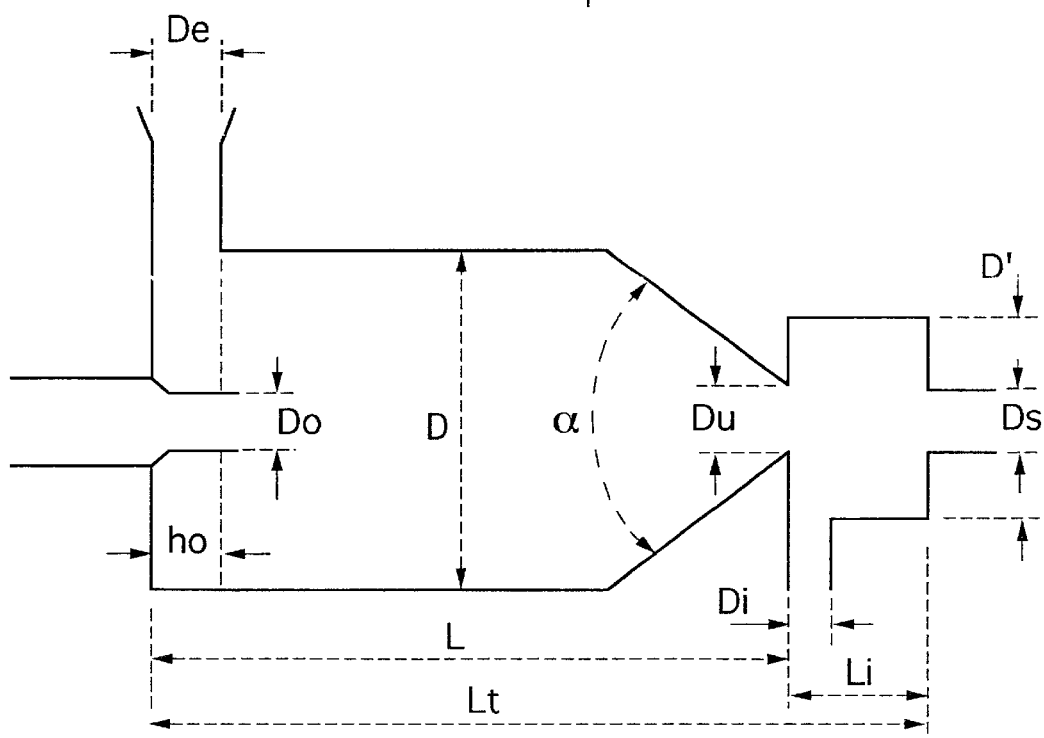
Figure 3:
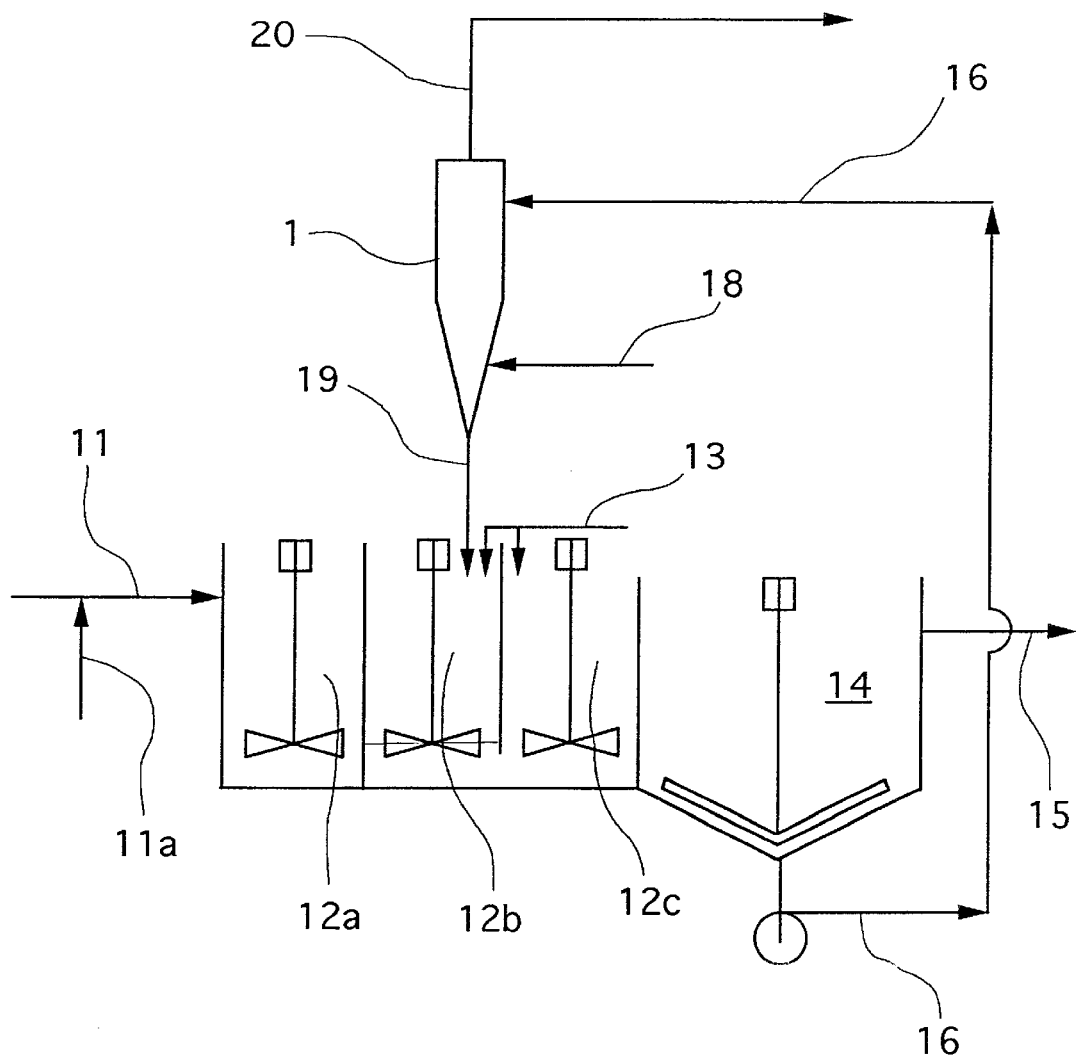

The invention will be easier understood with the following description of a non-restrictive embodiment of a circular grit trap according to the invention, with reference to the drawings, in which:

FIG. 1 shows said circular grit trap in longitudinal section,

FIG. 2 indicates the geometrical characteristics of the circular grit traps of the invention, FIG. 3 shows an installation for water treatment integrating a circular grit trap according to FIGS. 1 and 2.

The circular grit trap shown comprises a cylindrical-conical body 1 comprising a cylindrical part 1a and a conical part 1b. A wear part 4 ends the conical part of the cylindrical-conical body 1.

A cylindrical chamber 3 for the injection of a cleaning liquid is associated with wear part 4. It ends in a downflow nozzle 5 screwed into embedded inserts. The injection of auxiliary liquid into the injection chamber is made via a fluted screw socket in PVC 12 specially designed for connecting flexible piping. Chamber 3 is held integral with body 1 by means of bolts. The wear part 4 is inserted at the base of body 1 and held in place by chamber 3. The seal of the chamber plus body unit is ensured by toroidal joints held in place inside grooves. The upflow outlet pipe 2 is integral with the lid of the grit trap and is fixed to body 1 by bolts 10. The seal is also ensured by toroidal joints 6 held in place inside grooves on the lid. The bolts also hold in place a cover in stainless steel 8 which caps the lid. Fixed to this stainless steel cover is a stainless steel tube used for a metal connection (stainless steel). This stainless steel unit also serves to rigidify the upper part of the circular grit trap.

A ring in stainless steel 13 is used for the quick connection of the supply which is achieved by press-fitting. The seal between the ring and the supply to the grit trap is ensured by toroidal joints held in place inside grooves. This type of fixation is innovative in that no bolt system is used to fix the supply part. This means that dismounting of the circular grit trap is quick and easy. This quick dismounting is also made possible by means of the adapted assembly of the upflow recovery pipe. This pipe is connected by means of an ordinary nut to the stainless steel tip integral with the stainless steel cover which caps the lid.

With reference to FIG. 2, the geometry of the circular grit traps according to the invention can be summarized by the following relative proportions:

$0.2 < De/D < 0.4$ (optimum of 0.28)
$0.2 < Do/D < 0.4$ (optimum of 0.28)
$0.1 < DuD < 0.3$ (optimum of 0.2)
$0.4 < ho/D < 0.7$ (optimum of 0.6)
$0.1 < Ds/D < 0.25$ (optimum of 0.17)
$0.35 < D'/D < 0.65$ (optimum at 0.48)
$2.5 < Lt/D < 4.5$ (optimum at 3.5)
$0.04 < Di/D < 0.12$ (optimum at 0.075)
$0.35 < Li/D < 0.65$ (optimum at 0.5)
$2 < L/D < 4$ (optimum at 3)
$30° < \alpha < 150°$ (optima at 60° and 75°) The injection chamber is characterized by an entry diameter (Du), by an outlet diameter (Ds). And its own diameter (D').

The design of the claimed chamber, in its shape, is totally different from the layouts available up to the present time. Its diameter D' creates a sudden widening into which the microsand is driven to undergo washing.

The circular grit trap shown in FIGS. 1 and 2 was used in an installation for water treatment according to FIG. 3.

This installation comprises an inlet 11 for water to be treated provided with means 11a for adding a coagulant agent. This water is directed towards three tanks 12a, 12b and 12c for coagulation, flocculation and maturing respectively, mounted in series and fitted with stirring means. Dispenser layers 12 permit the distribution of a flocculating polymer 13 in tanks 12b and 12c. Tank 12b contains microsand to ballast the floc formed. These tanks are followed by a decanter 14 from which the clarified water is extracted at 15. The sludge extracted from this decanter is directed, by means of pump 17, via a recycling piping 16 towards a circular grit trap such as described above. According to the invention, supply piping 18 is provided to bring the supply of auxiliary liquid to this circular grit trap. The washed microsand is evacuated from the circular grit trap and redirected by means of piping 19 towards the flocculation tank 12b. The upflows are evacuated at 20.

The mode of embodiment of the invention described here is not intended to reduce the scope of the invention. It may therefore undergo numerous modifications while remaining within this scope.

What is claimed is:

1. A method of treating water or wastewater comprising:

a. treating the water or wastewater in a treatment facility by a ballasted flocculation process which produces sludge containing granular material;

b. directing the sludge into a circular grit trap having a cylindrical section, a conical section, and an upflow outlet, and separating substantial sludge from the granular material as the sludge moves around the cylindrical and conical sections of the circular grit trap, and wherein the separated sludge is discharged through the upflow outlet;

c. directing the remaining sludge and granular material from the conical section into a washing chamber;

d. injecting an auxiliary liquid into the chamber and washing the granular material to further separate sludge from the granular material;

e. directing the sludge separated from the granular material in the chamber back up through the grit trap and out the upflow outlet; and f. directing the separated granular material from the chamber and recycling the separated granular material back to the treatment facility.

2. The method of claim 1 wherein the auxiliary liquid is injected into the chamber at a flow rate of between 50% and 200% of the flow rate out of the chamber less the flow rate of granular material passing from the chamber.

3. The method of claim 1 wherein injecting an auxiliary liquid into the chamber includes injecting water into the chamber.

4. The method of claim 3 wherein the auxiliary liquid further comprises at least one washing, disinfecting, or ballasted flocculation promoter agent.

5. The method of claim 4 wherein the agent is selected from the group consisting of sodium hydroxide, hydrochloric, sulphuric, nitric, phosphoric, citric, formic, carbonic acids, bleach, dissolved chlorine, chlorine dioxide, gaseous or dissolved ozone, hydrogen peroxide, aluminum or iron salts, and flocculation polymers.

6. The method of claim 1 wherein the chamber is generally cylindrical and has a diameter of approximately 35% to 65% of the diameter of the cylindrical section of the circular grit trap.

7. The method of claim 1 wherein the conical section of the circular grit trap forms an angle of approximately 30° to 150°.

8. The method of claim 1 wherein the conical section of the circular grit trap forms an angle of approximately 55° to 80°.

9. A method of recovering granular material used in a wastewater or water treatment process that produces a mixture of sludge and granular material, comprising:
- a. directing the sludge and granular material mixture into a circular grit trap that includes an upflow outlet and a downflow outlet;
- b. separating substantial sludge from the granular material as the mixture of sludge and granular material moves through the grit trap with the separated sludge moving through the upflow outlet and out of the grit trap;
- c. directing the residual sludge and the granular material through the downflow outlet and into a washing chamber;
- d. injecting an auxiliary liquid into the washing chamber and washing the granular material and further separating the residual sludge from the granular material such that separated residual sludge flows back into the circular grit trap and is discharged therefrom via the upflow outlet; and
- e. directing the separated granular material from the washing chamber and recycling the separated granular material back to a wastewater or water treatment facility.

* * * * *